United States Patent [19]

Altmayer

[11] Patent Number: 5,139,828
[45] Date of Patent: Aug. 18, 1992

[54] ORNAMENTAL PANEL

[75] Inventor: Andreas Altmayer, Mils, Austria

[73] Assignee: D. Swarovski & Co., Wattens, Austria

[21] Appl. No.: 554,398

[22] Filed: Jul. 19, 1990

[30] Foreign Application Priority Data

May 23, 1990 [DE] Fed. Rep. of Germany ....... 4016700

[51] Int. Cl.⁵ .......................... B32B 17/00; G02B 5/08
[52] U.S. Cl. ....................................... 428/13; 428/38; 428/46; 428/428; 428/912.2
[58] Field of Search .................. 428/13, 912.2, 13, 38, 428/46, 428, 912.2, 913.3

[56] References Cited

U.S. PATENT DOCUMENTS

| 4,052,863 | 10/1977 | Poll | 428/67 X |
| 4,261,649 | 4/1981 | Richard | 428/122 X |
| 4,500,571 | 2/1985 | Jones | 428/13 |
| 4,767,676 | 8/1988 | Swarovski et al. | 428/34.4 X |
| 4,824,729 | 4/1989 | Livi | 428/912.2 X |
| 4,935,268 | 6/1990 | Poll | 428/15 |

FOREIGN PATENT DOCUMENTS 252014 1/1988 European Pat. Off. .
654065 1/1986 Switzerland ..................... 428/912.2

Primary Examiner—Henry F. Epstein
Attorney, Agent, or Firm—Fish & Richardson

[57] ABSTRACT

An ornamental panel comprising a glass plate to which a number of faceted glass stones are fixed in an ornamental arrangement, and a mirror plate.

17 Claims, 1 Drawing Sheet

ORNAMENTAL PANEL

BACKGROUND OF THE INVENTION

1. Field of the Invention

The present invention relates to an ornamental panel having a glass plate to which a number of small faceted glass stones are fixed in an ornamental arrangement, and a mirror plate spaced from the glass plate.

2. Discussion of the Related Art

Different kinds of ornamental panels are known, including ones provided with faceted glass stones in an ornamental arrangement on a transparent plate as described in Swiss patent no. 654065.

However, there is a need to create new ornamental panels characterized by special optical and esthetic effects.

SUMMARY OF THE INVENTION

The invention is therefore based on the problem of providing new ornamental panels having special optical and esthetic effects.

The invention is based on the finding that such new ornamental panels can be provided by combining glass plates having faceted glass stones in an ornamental arrangement with mirror plates.

The object of the invention is an ornamental panel having a glass plate to which a number of small faceted glass stones are fixed in an ornamental arrangement, which is characterized in that the ornamental panel includes the glass plate with small glass stones and a mirror plate spaced therefrom as well as a frame.

The special optical and aesthetic effect of the inventive ornamental panel is that the mirror plate arouses the impression that small glass stones are fixed on both the glass plate and the mirror plate. This stresses the three-dimensional effect and makes the distance between the glass plate and the mirror plate recognizable to an observer. Also, the glittering effect caused by the faceted stones is reflected by the mirror plate, so that the reflection is multiplied.

According to a preferred embodiment, one narrow side of the ornamental panel is designed in such a way that light is brought onto the glass stones to as to intensify the optical effect.

The inventive ornamental panels are suitable for a great variety of applications. For example, they can be combined to design ceilings.

The ornamental panels can be of any desired size, the distance between the glass plate and the mirror plate being 10 to 20 mm, for example. The ornamental panels may be of rectangular or of asymmetrical design.

The glass plate with glass stones has the stones in an ornamental arrangement, no limits being set on the manifold possibilities.

The faceted glass stones are preferably cut glass stones made of lead crystal. Their size can vary within wide limits, for example between 0.3 and 10 mm. In terms of the shape, chatons are particularly suitable, but roses can also be used. The chatons are glued with the panel onto the glass plate which is to face the observer. The stones are preferably colorless but may also consist—only partly if one chooses—of colored glass or be vaporized with metal layers.

The stones are glued with transparent adhesive, preferably a UV-hardening acrylic adhesive, to the side of the glass plate facing away from the observer. The glass plate used is preferably a float glass plate.

The mirror plate is a customary mirror plate, the reflective layer generally being a silver layer. The mirror plate is spaced from the glass plate so that the stones are reflected in the mirror and the mirror side faces the observer.

It is preferable to combine the glass plate and mirror plate to form a closed ornamental panel, particularly in order to protect the glass stones from dirt and to make it easier to mount the panel.

The glass stones are preferably illuminated in particular from the side.

BRIEF DESCRIPTION OF THE DRAWINGS

The invention will be described in more detail below with reference to the drawing showing an exemplary embodiment.

DETAILED DESCRIPTION OF THE PREFERRED EMBODIMENTS

Figure 1:
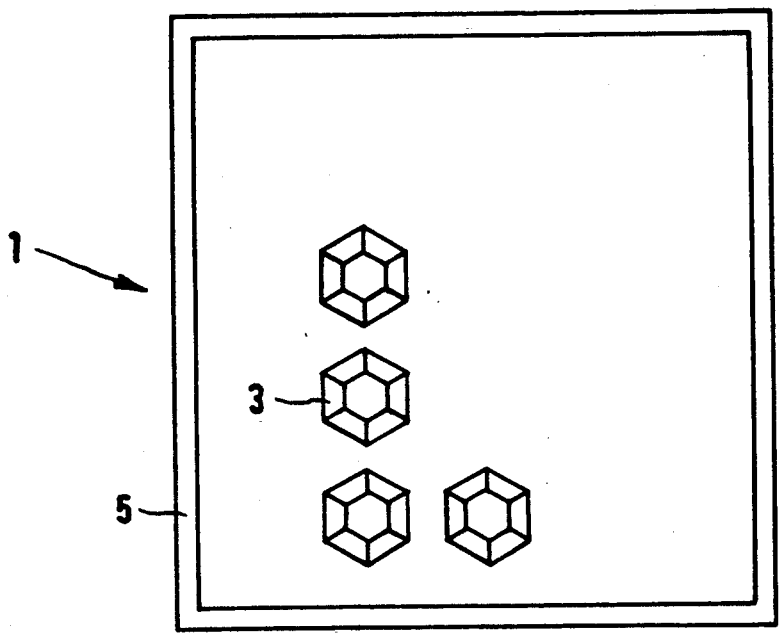
FIG. 1 shows a top view of an ornamental panel.

FIG. 1 shows panel 1 having an ornament consisting of a number of small faceted glass stones 3. The panel is mounted in a frame 5.

Figure 2:
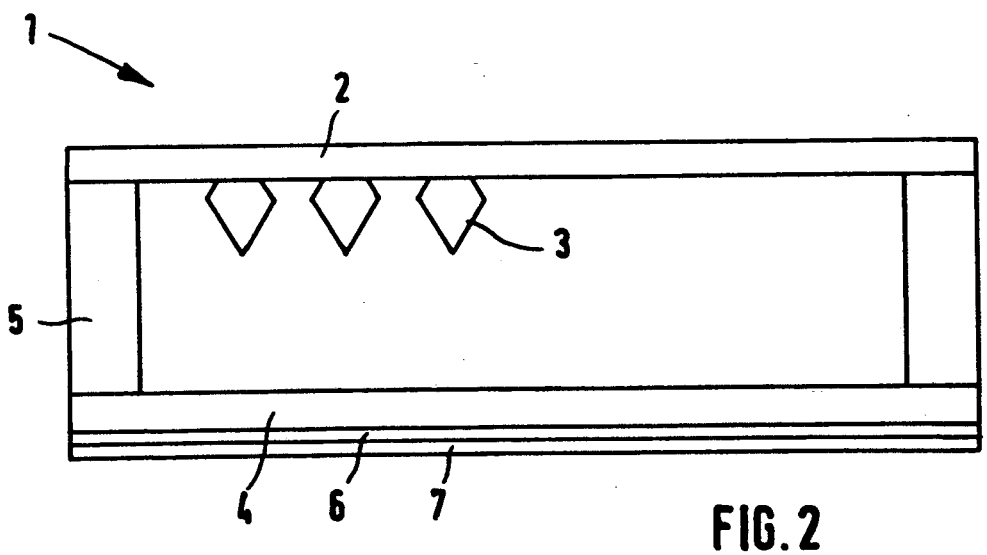
FIG. 2 shows a cross section of an ornamental panel.

As seen from FIG. 2, glass plate 2 with faceted stones 3 faces the observer. The faceted stones 3 have their tables attached to the glass plate. Spaced therebehind is mirror plate 4 with mirror layer 6 and protective layer 7, the mirror side facing the glass stones. The two plates are integrated by a frame 5. According to a preferred embodiment there is a possibility of introducing optical conductors into the interior of panel 1 through frame 5.

I claim:

1. An ornamental panel comprising
a glass plate;
a plurality of glass stones disposed on said glass plate;
a mirror spaced from said glass plate; and
frame means contacting both said glass plate and said mirror for spacing said glass plate from said mirror.

2. An ornamental panel as defined in claim 1, wherein said frame means also spaces said glass stones from said mirror.

3. An ornamental panel as defined in claim 1, wherein said glass stones are between 0.3 and 10.0 mm in size.

4. An ornamental panel as defined in claim 1, wherein said glass stones are colorless.

5. An ornamental panel as defined in claim 1, wherein at least one of said glass stones is made of colored glass.

6. An ornamental panel as defined in claim 1, wherein at least one of said glass stones is made of glass vaporized with metal layers.

7. An ornamental panel as defined in claim 1, wherein said mirror comprises a mirror plate, a mirror layer and a protective layer and said frame means spaces said glass plate from said mirror plate.

8. An ornamental panel as defined in claim 7, wherein the distance said glass plate is spaced from said mirror plate is between 10 mm to 20 mm.

9. An ornamental panel as defined in claim 1, wherein said glass stones are shaped as chatons.

10. An ornamental panel as defined in claim 1, wherein said glass stones are shaped as roses.

11. An ornamental panel as defined in claim 1, wherein said glass stones are faceted and each include a table.

12. An ornamental panel as defined in claim 11, wherein each said table of said glass stones is attached to said glass plate.

13. An ornamental panel as defined in claim 1, wherein said glass stones are attached to said glass plate with a transparent adhesive.

14. An ornamental panel as defined in claim 13, wherein said transparent adhesive is a UV-hardening acrylic adhesive.

15. An ornamental panel as defined in claim 1, further comprising means for illuminating said glass stones disposed in said frame.

16. An ornamental panel as defined in claim 15, wherein said means for illuminating includes optical conductors.

17. An ornamental panel as defined in claim 1, wherein said glass plate has a first surface facing toward said mirror and a second surface facing away from said mirror, and said glass stones are disposed on said first surface of said glass plate.

* * * * *